United States Patent
Choi et al.

(10) Patent No.: US 10,688,009 B2
(45) Date of Patent: Jun. 23, 2020

(54) MOTION ASSISTANCE APPARATUS

(71) Applicant: Samsung Electronics Co., Ltd., Suwon-si, Gyeonggi-do (KR)

(72) Inventors: Hyun Do Choi, Yongin-si (KR); Youn Baek Lee, Yongin-si (KR); Jeonghun Kim, Suwon-si (KR); Se-Gon Roh, Suwon-si (KR); Minhyung Lee, Seoul (KR); Jongwon Lee, Suwon-si (KR); Byungjune Choi, Gunpo-si (KR); Jung-Yun Choi, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 568 days.

(21) Appl. No.: 15/426,463

(22) Filed: Feb. 7, 2017

(65) Prior Publication Data
US 2018/0055711 A1   Mar. 1, 2018

(30) Foreign Application Priority Data

Aug. 26, 2016 (KR) .................. 10-2016-0109490

(51) Int. Cl.
*A61H 3/00* (2006.01)
*B25J 9/00* (2006.01)
(Continued)

(52) U.S. Cl.
CPC .......... *A61H 1/0262* (2013.01); *A61H 1/024* (2013.01); *A61H 1/0244* (2013.01); *A61H 1/0266* (2013.01); *A61H 1/0277* (2013.01); *A61H 1/0281* (2013.01); *A61H 1/0285* (2013.01); *A61H 3/00* (2013.01); *A61H 3/06* (2013.01); *B25J 9/0006* (2013.01); *B25J 9/1694* (2013.01); *A61H 2003/007* (2013.01); *A61H 2201/1215* (2013.01); *A61H 2201/1246* (2013.01);
(Continued)

(58) Field of Classification Search
CPC ...... A61H 3/00; A61H 1/0266; A61H 1/0262; A61H 1/0237; B25J 9/0006
USPC ...................................... 601/5, 34
See application file for complete search history.

(56) References Cited

U.S. PATENT DOCUMENTS 5,067,479 A   11/1991   Saringer et al.
8,353,854 B2   1/2013   Horst et al.
(Continued)

FOREIGN PATENT DOCUMENTS

CN    105125381 A   12/2015
EP    2 332 508 A1   6/2011
(Continued)

OTHER PUBLICATIONS

Partial European Search Report issued by the European Patent Office dated Aug. 21, 2017 for corresponding EP Patent Application No. 17151722.0.
(Continued)

*Primary Examiner* — Marcia L Watkins
(74) *Attorney, Agent, or Firm* — Harness, Dickey and Pierce, P.L.C.

(57) ABSTRACT

A motion assistance apparatus includes a proximal support configured to support a proximal part of a user, a distal support configured to support a distal part of the user, and a rotary frame connected to the distal support, and configured to simultaneously perform a translational motion and a rotational motion relative to the proximal support.

29 Claims, 21 Drawing Sheets

(51) Int. Cl.
  *A61H 1/02* (2006.01)
  *A61H 3/06* (2006.01)
  *B25J 9/16* (2006.01)

(52) U.S. Cl.
  CPC .......... *A61H 2201/149* (2013.01); *A61H 2201/1481* (2013.01); *A61H 2201/164* (2013.01); *A61H 2201/165* (2013.01); *A61H 2201/1642* (2013.01); *A61H 2201/1664* (2013.01); *A61H 2201/1671* (2013.01); *A61H 2201/1673* (2013.01); *A61H 2201/1676* (2013.01); *A61H 2201/5005* (2013.01); *A61H 2201/5007* (2013.01); *A61H 2201/5071* (2013.01)

(56) References Cited

U.S. PATENT DOCUMENTS

| | | | |
|---|---|---|---|
| 8,790,282 | B2 | 7/2014 | Jung et al. |
| 2006/0064044 | A1 | 3/2006 | Schmehl |
| 2006/0069336 | A1 | 3/2006 | Krebs et al. |
| 2011/0112447 | A1* | 5/2011 | Hsiao-Wecksler ................ A61H 1/0266 601/33 |
| 2012/0289870 | A1 | 11/2012 | Hsiao-Wecksler et al. |
| 2013/0046218 | A1 | 2/2013 | Wiggin et al. |
| 2013/0345601 | A1 | 12/2013 | Bhugra et al. |
| 2015/0196450 | A1 | 7/2015 | Lee et al. |
| 2015/0321341 | A1 | 11/2015 | Smith |
| 2016/0015589 | A1 | 1/2016 | Lee et al. |

FOREIGN PATENT DOCUMENTS

| | | |
|---|---|---|
| EP | 2 740 457 A2 | 6/2014 |
| EP | 2 856 997 A2 | 4/2015 |
| JP | 2015-181661 A | 10/2015 |
| KR | 10-2012-0047401 A | 5/2012 |
| KR | 10-1222914 B1 | 1/2013 |
| KR | 1020140001419 A1 | 1/2014 |
| KR | 10-2015-0085608 A | 7/2015 |
| KR | 10-2015-0117539 A | 10/2015 |
| WO | WO-2015/0073490 A1 | 5/2015 |

OTHER PUBLICATIONS

Extended European Search Report issued by the European Patent Office dated Dec. 5, 2017 for corresponding EP Patent Application No. 17151722.0.

Steven H. Collins, et al , "Reducing the energy cost of human walking using an unpowered exoskelton", Nature, 2015.

Mooney, L. M., Rouse, E. J. & Herr, H. M., "Autonomous exoskeleton reduces metabolic cost of human walking during load carriage", J. Neuroeng. Rehabil. 11, 1-6 (2014).

Malcolm, P., Derave, W., Galle, S. & De Clercq, D., "A simple exoskeleton that assists plantarflexion can reduce the metabolic cost of human walking", PLOS ONE 8, e56137, Feb. 13, 2013.

Sawicki, G. S. & Ferris, D. P., "Mechanics and energetics of level walking with powered ankle exoskeletons", J. Exp. Biol. 211, 1402-1413 (2008).

* cited by examiner

MOTION ASSISTANCE APPARATUS

CROSS-REFERENCE TO RELATED APPLICATION

This application claims under 35 U.S.C. § 119 to Korean Patent Application No. 10-2016-0109490 filed on Aug. 26, 2016, in the Korean Intellectual Property Office, the entire contents of which are incorporated herein by reference in their entirety.

BACKGROUND

1. Field

At least one example embodiment relates to a motion assistance apparatus.

2. Description of the Related Art

Motion assistance apparatuses enabling the elderly and/or patients having joint problems to walk with less effort, and motion assistance apparatuses increasing muscular strength of users for military purposes are being developed.

SUMMARY

Some example embodiments relate to a motion assistance apparatus.

In some example embodiment, the motion assistance apparatus includes a proximal support configured to support a proximal part of a user; a distal support configured to support a distal part of the user; and a rotary frame connected to the distal support, the rotary frame configured to simultaneously perform a translational motion and a rotational motion relative to the proximal support.

In some example embodiment, the proximal support is configured to support a calf of the user, the distal support is configured to support a foot of the user, and the rotary frame is on an anterior of an ankle of the user while the user is wearing the motion assistance apparatus.

In some example embodiment, the proximal support is configured to support a calf of the user, the distal support is configured to support a foot of the user, and the rotary frame is configured connect to the distal support via a first portion thereof, the first portion of the rotary frame being between the ankle and a forefoot of the user while the user is wearing the motion assistance apparatus.

In some example embodiment, the motion assistance apparatus further includes a sliding frame connected to the rotary frame, the sliding frame configured to slide relative to the proximal support to rotate the rotary frame.

In some example embodiment, the motion assistance apparatus further includes a power distributer configured to receive power provided by a driving source, the power distributor including a first output terminal connected to the sliding frame and a second output terminal connected to the rotary frame, the first output terminal and the second output terminal having different translational speeds with respect to the proximal support.

In some example embodiment, the motion assistance apparatus further includes a connecting rod configured to connect the second output terminal and the rotary frame.

In some example embodiment, the second output terminal includes a protrusion configured to protrude toward the first output terminal, and a first end portion of the connecting rod is configured to connect to the second output terminal via the protrusion.

In some example embodiment, the connecting rod comprises: a rod body; a first joint at a first end portion of the rod body, the first joint being rotatably connected to the second output terminal with at least two degrees of freedom; and a second joint at a second end portion of the rod body, the second joint being rotatably connected to the rotary frame with at least two degrees of freedom.

In some example embodiment, the sliding frame performs a translational motion relative to the proximal support and the first end portion of the connecting rod is configured to perform a translational motion relative to the sliding frame, if the power distributor receives the power.

In some example embodiment, the power distributor further includes a connecting member configured to connect the first output terminal and the second output terminal, and the power distributor is configured to transmit the power to one of the first output terminal, the second output terminal, and the connecting member.

In some example embodiment, the connecting member is rotatably connected to the proximal support.

In some example embodiment, the connecting member comprises: a pair of parallel links each configured to connect the first output terminal and the second output terminal such that the first output terminal and the second output terminal are parallel to each other.

In some example embodiment, the rotary frame comprises: a base link configured to rotate relative to the sliding frame in a yaw direction.

In some example embodiment, the rotary frame further comprises: a support link connected to the distal support, the support link configured to rotate relative to the base link in a pitch direction.

In some example embodiment, the rotary frame further comprises: a pair of connecting links configured to connect the base link and the support link.

In some example embodiment, a distance between a pair of straight lines extending in longitudinal directions of the pair of connecting links decreases from the base link toward an opposite side of the support link.

In some example embodiment, the pair of connecting links are connected to the support link by a first pair of rotational axes and to the base link by a second pair of rotational axes such that a distance between the first pair of rotation axes connected to the support link is greater than a distance between the second pair of rotation axes connected to the base link.

In some example embodiment, the motion assistance apparatus further comprises a driving source configured to provide the power to operate the rotary frame; at least one pressure sensor associated with the distal support, the at least one pressure sensor configured to measure a pressure applied by the distal part of the user to the distal support; and a controller configured to control the driving source based on data measured by the at least one pressure sensor.

In some example embodiment, the controller is configured to control the driving source such that the distal support performs a dorsi-flexion motion, if the pressure measured by the at least one pressure sensor is less than or equal to a set pressure.

In some example embodiment, the proximal support is configured to support a calf of the user, and the distal support is configured to support a foot of the user, and the at least one pressure sensor comprises: a forefoot sensor configured to sense a pressure at a forefoot of the user; and a rearfoot sensor configured to sense a pressure at a rearfoot of the user.

In some example embodiment, the controller is configured to control the driving source such that the distal support performs a plantar-flexion motion, if the pressure measured by the forefoot sensor is greater than or equal to a first set pressure.

In some example embodiment, the controller is configured to control the driving source such that the distal support performs a plantar-flexion motion, if a difference between the pressure measured by the rearfoot sensor and the pressure measured by the forefoot sensor is greater than or equal to a second set pressure.

Some other example embodiments also relate to a motion assistance apparatus.

In some example embodiment, the motion assistance apparatus includes a proximal support configured to attach to a portion of a shank below a knee of a user; a distal support configured to attached to a foot on a front side of an ankle of the user; and a frame structure connected between the proximal support and the distal support such that frame structure is configured to sit between the knee and the foot on a front side of the user, if the proximal support and the distal support are attached to the user, the frame structure configured to provide an assistance force to assist the user with a movement of the ankle.

In some example embodiment, the motion assistance apparatus is configured to provide the assistance force to the ankle without any movable structures between the shank and the foot on a rear side of the user, if the motion assistance apparatus is attached to the user.

In some example embodiment, the frame structure comprises: a sliding frame configured to slide relative to the proximal support; and a rotary frame connected to the distal support, the rotary frame configured to rotate relative to the sliding frame.

In some example embodiment, the rotary frame is configured to simultaneously perform a translational motion and a rotational motion relative to the proximal support.

In some example embodiment, the motion assistance apparatus further includes a power distributor configured receive power provided by a driving source, the power distributor including a first output terminal connected to the sliding frame and a second output terminal connected to the rotary frame, the first output terminal and the second output terminal having different translational speeds with respect to the proximal support.

In some example embodiment, the motion assistance apparatus further includes a connecting rod configured to connect the second output terminal and the rotary frame.

In some example embodiment, the rotary frame has a four-bar linkage structure including a base link connected to the sliding frame, and a support link connected to the distal support.

Some other example embodiments also relate to a motion assistance apparatus.

In some example embodiment, the motion assistance apparatus includes a proximal support configured to attach to a portion below a knee of a user; a distal support configured to attach to a foot of the user; and a rotary frame between the proximal support and the distal support, the rotary frame having two degrees of freedom including a first degree of freedom and a second degree of freedom, the first degree of freedom facilitating a dorsi-flexion motion and a plantar-flexion motion relative to a talocrural joint of the user while the motion assistance apparatus is attached to the user, and the second degree of freedom facilitating an eversion motion and an inversion motion relative to a subtalar joint of the user while the motion assistance apparatus is attached to the user.

In some example embodiment, the motion assistance apparatus further includes a power distributor configured to receive power provided by a driving source, the power distributor including a first output terminal and a second output terminal, the first output terminal and the second output terminal having different translational speeds with respect to the proximal support; a sliding frame connected to the first output terminal; and a connecting rod configured to connect the second output terminal and the rotary frame.

In some example embodiment, the rotary frame has a four-bar linkage structure including a base link connected to the sliding frame, and a support link connected to the distal support.

In some example embodiment, the support link is configured to simultaneously perform a translational motion and a rotational motion relative to the base link such that the support link has one degree of freedom relative to the base link to allow the dorsi-flexion motion and the plantar-flexion motion relative to the talocrural joint of the user.

In some example embodiment, the base link is rotatably connected to a rotation axis in the sliding frame such that the base link has one degree of freedom relative to the sliding frame to allow the eversion motion and the inversion motion relative to the subtalar joint of the user.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1A:
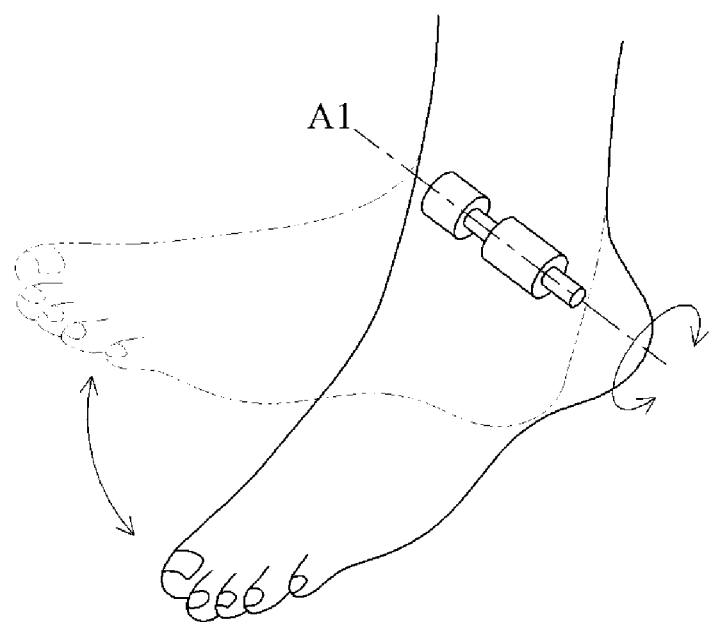
FIG. 1A illustrates a motion of a talocrural joint of a user.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1B:
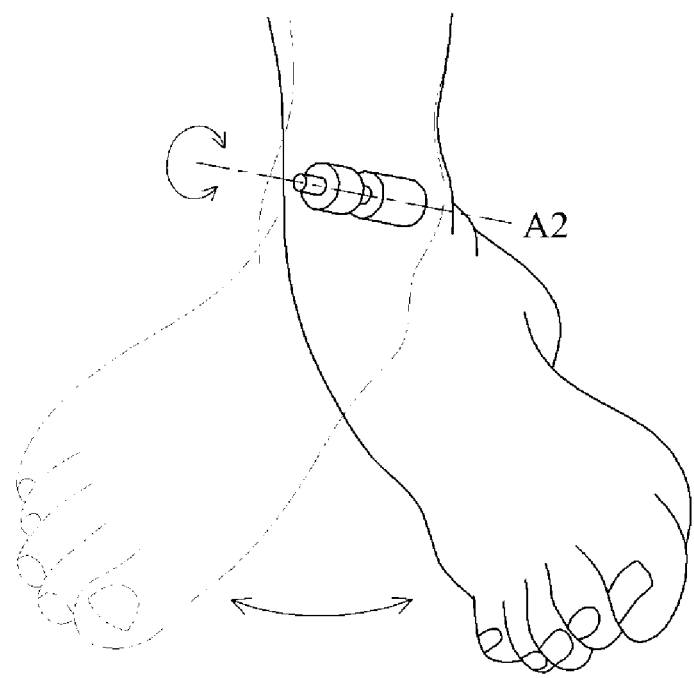
FIG. 1B illustrates a motion of a subtalar joint of a user.

FIG. 1A illustrates a motion of a talocrural joint of a user, and FIG. 1B illustrates a motion of a subtalar joint of the user.

Referring to FIGS. 1A and 1B, an ankle of the user moves relative to two axes, in detail, a first axis A1 and a second axis A2 conceptually illustrating a talocrural joint and a subtalar joint, respectively. The ankle of the user may perform a dorsi-flexion motion or plantar-flexion motion relative to the talocrural joint. Further, the ankle of the user may perform an eversion motion or inversion motion relative to the subtalar joint. When the ankle of the user moves relative to one of the first axis A1 and the second axis A2, a position or angle of the other of the first axis A1 and the second axis A2 may change. Hereinafter, it is described that a motion assistance apparatus according to at least one example embodiment may enable an ankle of a user to move relative to the first axis A1 and/or the second axis A2.

Figure 2:
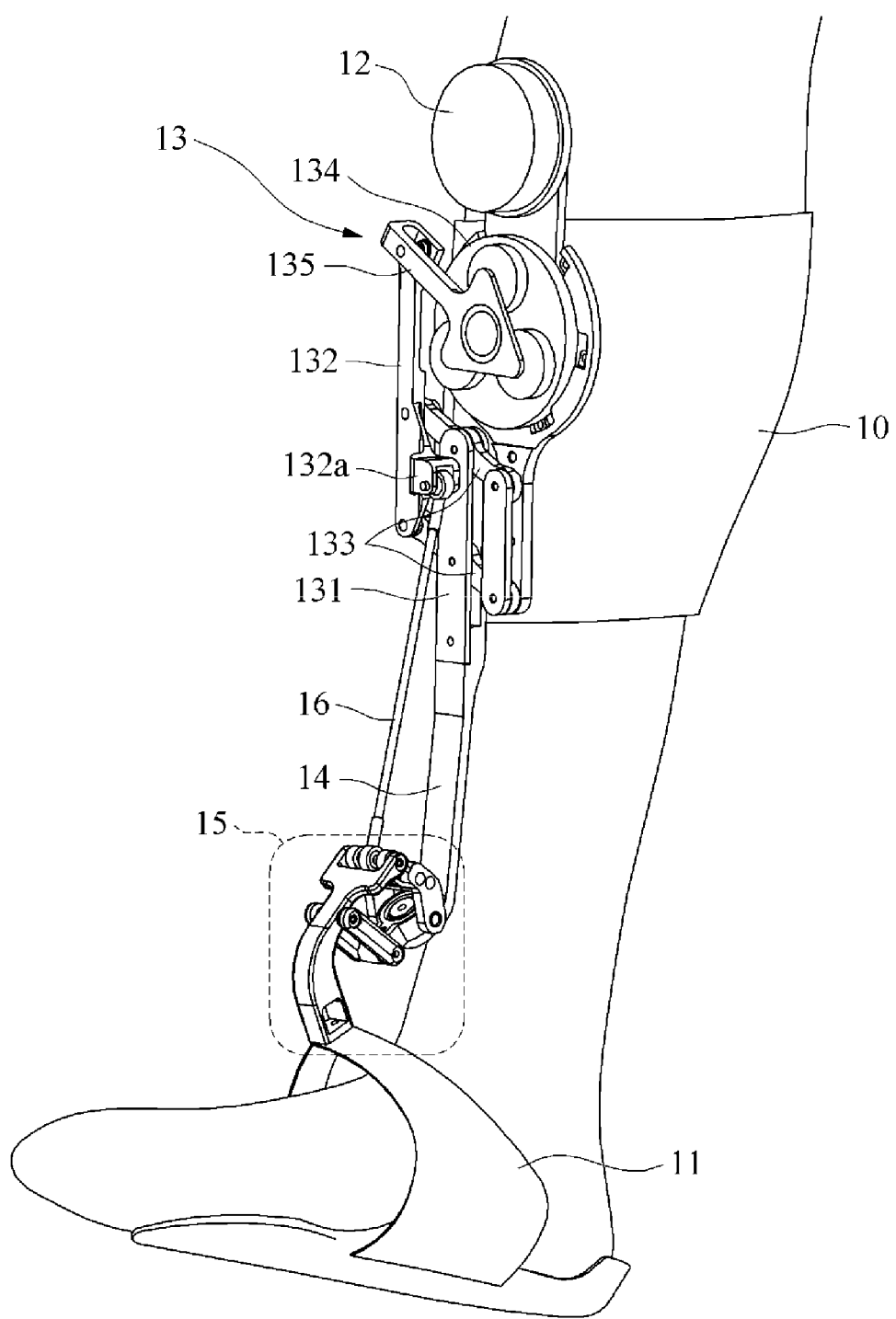
FIG. 2 is a perspective view of a motion assistance apparatus according to at least one example embodiment.

FIG. 2 is a perspective view of a motion assistance apparatus according to at least one example embodiment.

Referring to FIG. 2, a motion assistance apparatus 1 may be worn by a user to assist a motion of the user. The user may correspond to a human, an animal, or a robot. However, the user is not limited thereto.

The motion assistance apparatus 1 may include a proximal support 10, a distal support 11, a driving source 12, a power distributor 13, a sliding frame 14, a rotary frame 15, and a connecting rod 16.

The proximal support 10 and the distal support 11 may be disposed on opposite sides from a joint of the user to support a proximal part and a distal part of the user, respectively. For example, the proximal support 10 and the distal support 11 may be disposed on opposite sides from an ankle joint of the user. The proximal support 10 may support a portion below a knee of the user, for example, a calf, and the distal support 11 may support a portion below the ankle of the user, for example, a foot. In detail, the proximal support 10 may include a detachable belt to support the entire circumference of the calf of the user, and the distal support 11 may include a structure that encloses the entire top and the sole of the foot to support the foot of the user.

Although FIG. 2 illustrates a case in which the motion assistance apparatus 1 assists a motion of the ankle of the user, the motion assistance apparatus 1 may also assist a motion of another portion in an upper body, for example, a wrist, an elbow, or a shoulder of the user, or a motion of another portion in a lower body, for example, a knee or a hip joint of the user. The motion assistance apparatus 1 may assist a motion of a portion of the user. Hereinafter, a case in which the motion assistance apparatus 1 assists a motion of an ankle of a human will be described. However, example embodiments are not limited thereto.

The driving source 12 may provide power to operate the power distributor 13. The driving source 12 may be, for example, an actuator such as a motor to provide rotational power as shown in FIG. 2, or an actuator such as a piston-cylinder actuator or a wire-driven actuator to provide translational power unlike FIG. 2. Hereinafter, a case in which the driving source 12 is a motor will be described. However, example embodiments are not limited thereto.

The power distributor 13 may include a first output terminal 131 and a second output terminal 132 configured to operate using the power provided by the driving source 12. The first output terminal 131 and the second output terminal 132 may be connected to the sliding frame 14 and the rotary frame 15 to transfer the power thereto, respectively.

The power distributor 13 may further include a decelerator 134 configured to decelerate the power received from the driving source 12, a power transmitting member 135 configured to transfer the power transmitted to the decelerator 134 to at least one of the first output terminal 131 and the second output terminal 132, and a connecting member 133 configured to connect the first output terminal 131 and the second output terminal 132 such that one of the first output terminal 131 and the second output terminal 132 may move relative to the other.

The decelerator 134 may include a transmission mechanism that decelerates and transfers a rotational motion without conversion, for example, a planetary gear or a compound gear in which gears having different gear ratios are combined. The decelerator 134 may include a transmission mechanism such as a ball screw type that converts a rotational motion into a linear motion. The decelerator 134 may include a transmission mechanism that decelerates and transfers a linear motion without conversion, for example, a movable pulley. However, the type of the decelerator 134 is not limited thereto.

The connecting member 133 may enable the first output terminal 131 and the second output terminal 132 to move at different speeds in the same direction when the power distributor 13 operates. The speed of the second output terminal 132 may be greater than the speed of the first output terminal 131. The connecting member 133 may be rotatably connected to each of the first output terminal 131 and the second output terminal 132. In the above structure, the two output terminals may move relative to each other. For example, the connecting member 133 may be a longitudinal member with one side rotatably attached to the proximal support 10 that encloses a calf of the user and traversing a portion below the knee of the user. In the above structure, the first output terminal 131 may move relative to the proximal support 10 in a vertical direction connecting the knee and the ankle of the user, and similarly the second output terminal 132 may also move relative to the first output terminal 131 in the vertical direction.

The connecting member 133 may include, for example, a pair of parallel links each configured to connect the first output terminal 131 and the second output terminal 132. In such a parallelogram four-bar linkage structure, the first output terminal 131 and the second output terminal 132 may slide relative to each other while remaining parallel to each other.

The power transmitting member 135 may be, for example, a crank that changes a rotational motion of the decelerator 134 to a linear motion. The type of the power transmitting member 135 may vary based on a type of power to be transmitted.

The sliding frame 14 may be connected to the first output terminal 131, and slide relative to the proximal support 10. For example, as shown in FIG. 2, the sliding frame 14 and the first output terminal 131 may be connected to each other to perform a single rigid body motion.

The rotary frame 15 may simultaneously perform a translational motion and a rotational motion relative to the proximal support 10. A first portion of the rotary frame 15 may be connected to the distal support 11 that encloses the top and the sole of the foot on a front side of the ankle of the user, a second portion thereof may be connected to the second output terminal 132 through the connecting rod 16, and a third portion thereof may be rotatably connected to the sliding frame 14. In the above structure, the rotary frame 15 may rotate about a vicinity of a talocrural joint of the user as a remote center of motion (RCM), without being connected to a configuration disposed on an axis of the talocrural joint of the user. Thus, the rotary frame 15 may implement a motion similar to an actual motion of the talocrural joint of the user.

All movable parts including the power distributor 13, the sliding frame 14, and the rotary frame 15 may be disposed on a front side between the ankle and a forefoot of the user while the user is wearing the motion assistance apparatus 1. In a vertical direction, the movable parts may be disposed between the foot and the knee of the user. In the above structure, the motion assistance apparatus 1 may be worn by the user while there is no movable part in a rear side of a lower leg. Further, when the movable parts are disposed on the front side of the lower leg, the user may put on or off typical shoes such as sneakers while wearing the motion assistance apparatus 1, and thus the user convenience may improve. For example, the motion assistance apparatus 1 in which the movable parts are disposed on the front side and the distal support 11 may be manufactured using a thin stiff plate that enables a user to easily put on or off shoes in their traditional size of the user while wearing the motion assistance apparatus 1.

The connecting rod 16 may connect the second output terminal 132 and the rotary frame 15. The connecting rod 16 may rotate the rotary frame 15 using the power received from the second output terminal 132.

Figure 3:
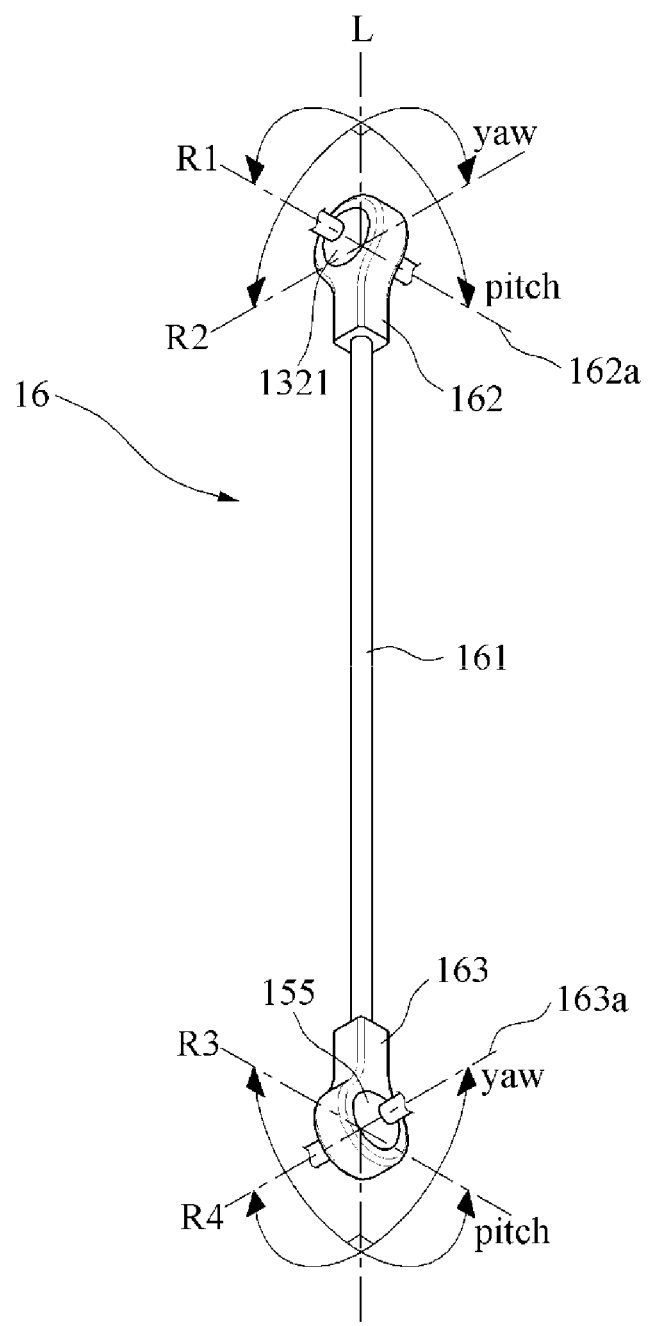
FIG. 3 is a perspective view of a connecting rod according to at least one example embodiment.

FIG. 3 is a perspective view of a connecting rod according to at least one example embodiment.

Referring to FIG. 3, the connecting rod 16 may include a rod body 161, and a first joint 162 and a second joint 163 that are disposed at both ends of the rod body 161. The first joint 162 may be rotatably connected to the second output terminal 132 to pivot with at least two degrees of freedom, and the second joint 163 may be rotatably connected to the rotary frame 15 to pivot with at least two degrees of freedom. For example, the second output terminal 132 may include a protrusion 132a of FIG. 2 and a first connecting body 1321, and the first joint 162 may be connected to the first connecting body 1321 to rotate with at least two rotational degrees of freedom. The two rotational degrees of freedom may include a yaw rotational degree of freedom that rotates about a first rotation axis R1 which is perpendicular to a longitudinal axis L of the rod body 161 in forward and backward directions, and a pitch rotational degree of freedom that rotates about a second rotation axis R2 which is perpendicular to the longitudinal axis L of the rod body 161 in leftward and rightward directions. As shown in FIG. 3, when the first connecting body 1321 is a spherical bearing or a ball joint, the first joint 162 may also perform a roll rotation about the longitudinal axis L of the rod body 161. Thus, the first joint 162 may rotate with three rotational degrees of freedom including the yaw rotational degree of freedom, the pitch rotational degree of freedom, and the roll rotational degree of freedom.

Similarly, the rotary frame 15 may include a second connecting body 155, and the second joint 163 may be connected to the second connecting body 155 to rotate with at least two rotational degrees of freedom. The two rotational degrees of freedom may include a yaw rotational degree of freedom that rotates about a third rotation axis R3 which is perpendicular to the longitudinal axis L of the rod body 161 in forward and backward directions, and a pitch rotational degree of freedom that rotates about a fourth rotation axis R4 which is perpendicular to the longitudinal axis L of the rod body 161 in leftward and rightward directions. As shown in FIG. 3, when the second connecting body 155 is a spherical bearing or a ball joint, the second joint 163 may also perform a roll rotation about the longitudinal axis L of the rod body 161. Thus, the second joint 163 may rotate with three rotational degrees of freedom including the yaw rotational degree of freedom, the pitch rotational degree of freedom, and the roll rotational degree of freedom. As shown in FIG. 3, an opening 162a of the first joint 162 connected to the first connecting body 1321 and an opening 163a of the second joint 163 connected to the second connecting body 155 may be provided in different directions, for example, to form a right angle.

The first joint 162 may be connected to the second output terminal 132 to perform a pitch rotation, and the second joint 163 may be connected to the rotary frame 15 to perform a pitch rotation. In the above structure, referring to FIG. 2, when the speed of the first output terminal 131 differs from the speed of the second output terminal 132, the rod body 161 may perform a pitch rotation relative to the sliding frame 14, thereby moving the second joint 163 relative to the sliding frame 14 in a forward or backward direction. In detail, the rotary frame 15 connected to the second joint 163 may perform a pitch rotation relative to the sliding frame 14, thereby implementing a dorsi-flexion or plantar-flexion motion of the talocrural joint of the user.

Further, the first joint 162 may be connected to the second output terminal 132 to perform a yaw rotation, and the second joint 163 may be connected to the rotary frame 15 to perform a yaw rotation. In the above structure, although the rotary frame 15 performs a yaw rotation relative to the sliding frame 14 when the user performs an eversion or inversion motion along a rotation axis of the subtalar joint, torque to be applied to the connecting rod 16 may be prevented. Thus, the user may comfortably perform the eversion or inversion motion without receiving external force generated by the connecting rod 16. In detail, the connecting rod 16 may operate in compliance with a motion of the subtalar joint of the user.

Figure 4:
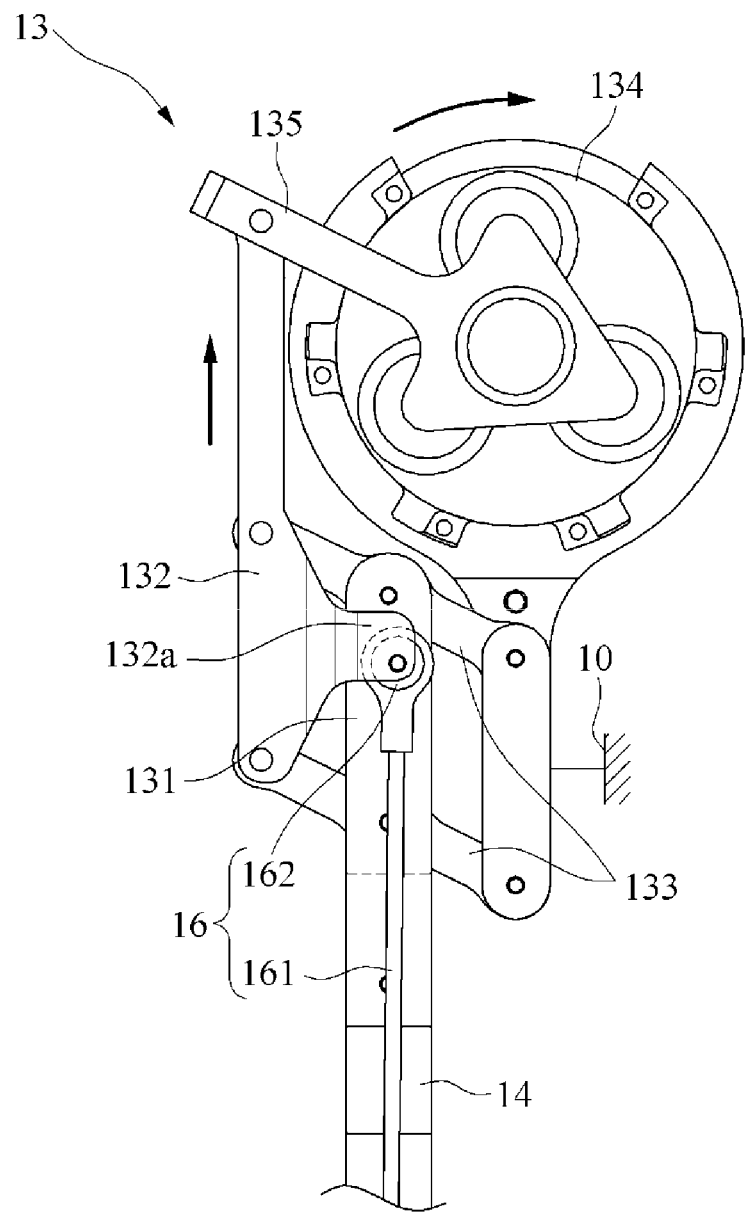
FIG. 4 is a front view of a power distributor in a dorsi-flexion state according to at least one example embodiment.
Figure 5:
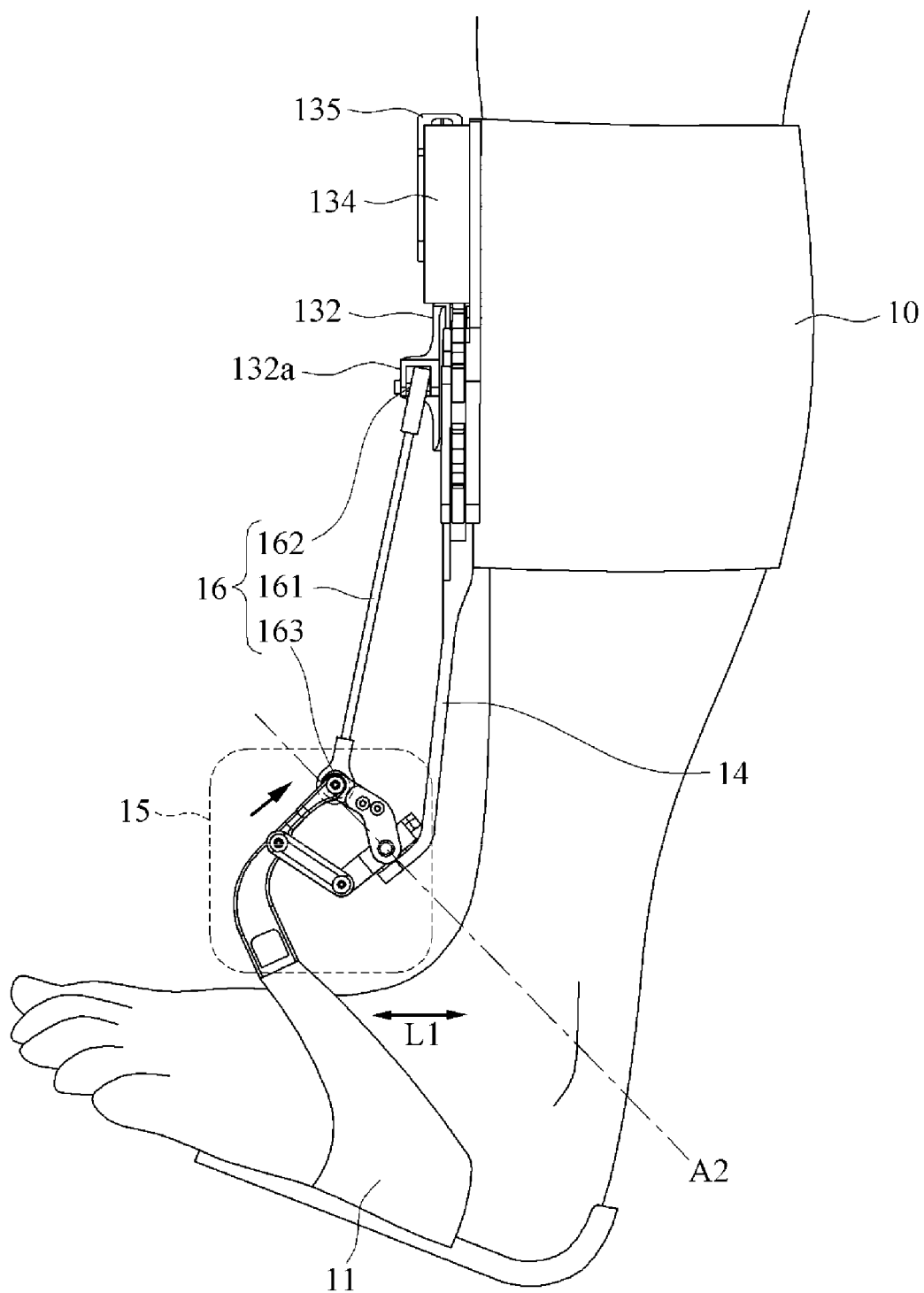
FIG. 5 is a side view of a motion assistance apparatus in a dorsi-flexion state according to at least one example embodiment.

FIG. 4 is a front view of a power distributor in a dorsi-flexion state according to at least one example embodiment, and FIG. 5 is a side view of a motion assistance apparatus in the dorsi-flexion state according to at least one example embodiment.

Referring to FIGS. 4 and 5, when the power distributor 13 operates, the power transmitting member 135 receiving rotational power from the decelerator 134 may change a rotational motion to a linear motion, thereby sliding the second output terminal 132 relative to the proximal support 10 in an upward direction. Since the first output terminal 131 is connected to the second output terminal 132 through the connecting member 133, the first output terminal 131 may also slide relative to the proximal support 10 in the upward direction.

A distance between the second output terminal 132 and a center of rotation of the connecting member 133 may be greater than a distance between the first output terminal 131 and the center of rotation of the connecting member 133. Thus, the second output terminal 132 may slide faster than the first output terminal 131 in the same direction.

Thus, the sliding frame 14 connected to the first output terminal 131 may perform a translational motion relative to the proximal support 10 in the upward direction, and the first joint 162 of the connecting rod 16 connected to the second output terminal 132 may perform a translational motion relative to the sliding frame 14 in the upward direction. The two-step translational motion may cause a speed difference between the sliding frame 14 and the connecting rod 16.

Referring to FIGS. 4 and 5, as the power transmitting member 135 moves in the upward direction, the sliding frame 14 may also move in the upward direction, thereby moving the motion axis A2 of the subtalar joint in the upward direction. The connecting rod 16 may move faster than the sliding frame 14 in the upward direction, and thus may rotate the rotary frame 15 connected to the sliding frame 14 in the upward direction, that is, in a clockwise direction of FIG. 5. The connecting rod 16 may enable the distal support 11 to perform a dorsi-flexion motion. For example, the motion assistance apparatus 1 may perform a dorsi-flexion motion in an upward direction within a range of 0 to 20 degrees while the user is wearing the motion assistance apparatus 1.

Meanwhile, the second output terminal 132 may include the protrusion 132a that protrudes toward the first output terminal 131, and the first joint 162 of the connecting rod 16 may be connected to the protrusion 132a. In the above structure, when viewing the motion assistance apparatus 1 as shown in FIG. 4, the sliding frame 14 and the connecting rod 16 may move nearly parallel. Thus, waste of the power transferred from the connecting rod 16 to the rotary frame 15 may be reduced (or, alternatively, prevented), and the power transferred through the connecting rod 16 may be easily interpreted.

Figure 6:
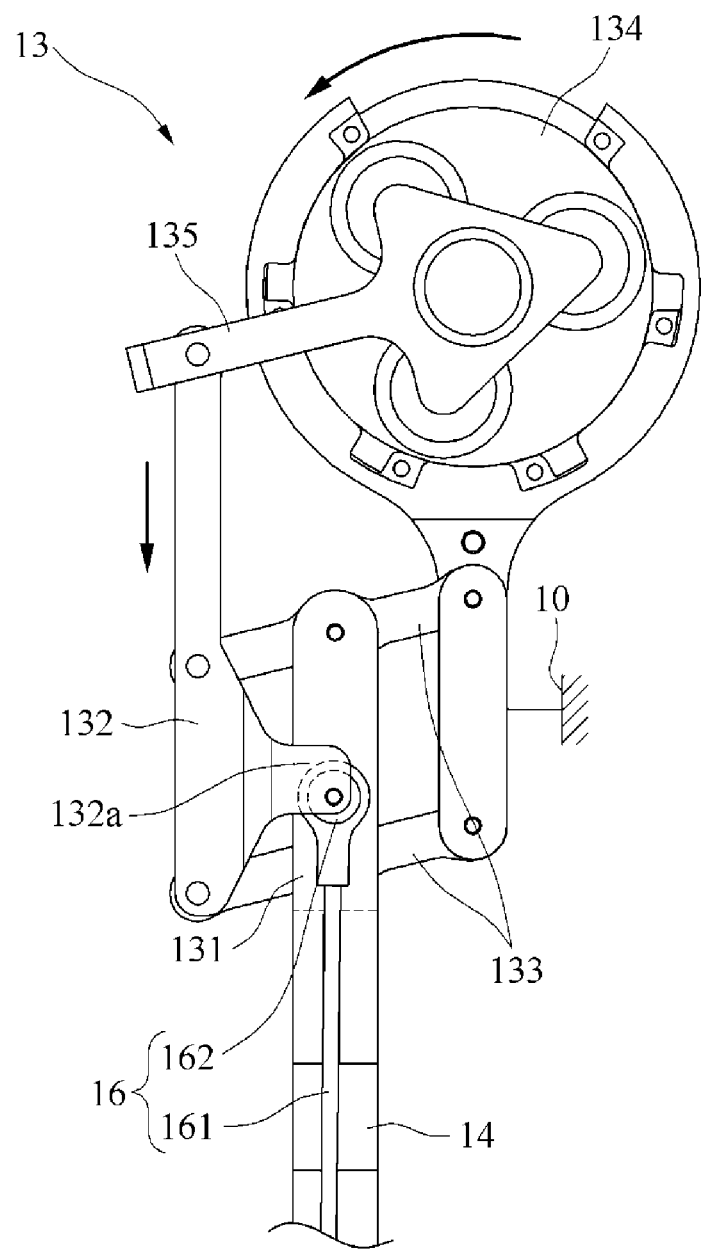
FIG. 6 is a front view of a power distributor in a plantar-flexion state according to at least one example embodiment.
Figure 7:
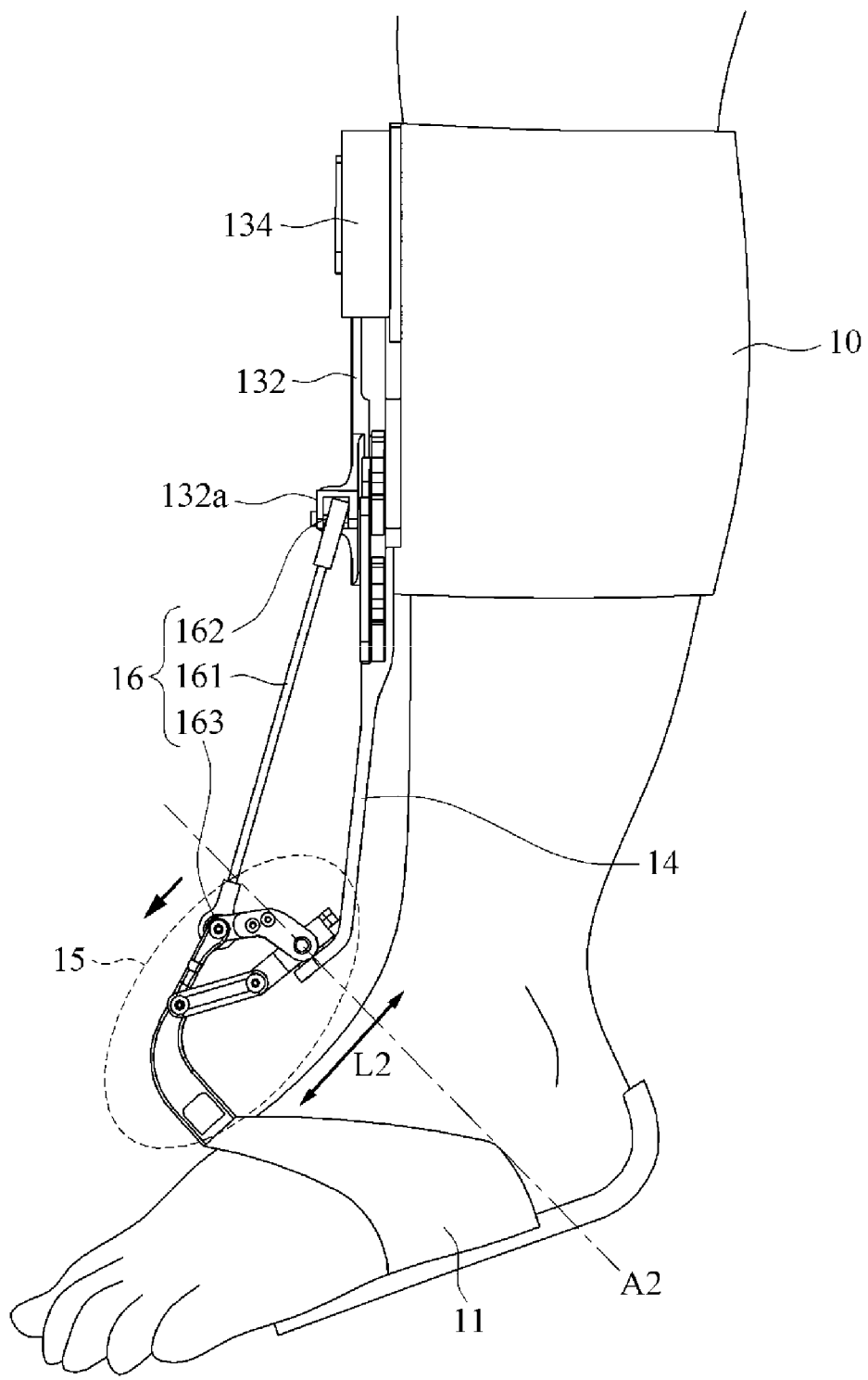
FIG. 7 is a side view of a motion assistance apparatus in a plantar-flexion state according to at least one example embodiment.

FIG. 6 is a front view of a power distributor in a plantar-flexion state according to at least one example embodiment, and FIG. 7 is a side view of a motion assistance apparatus in the plantar-flexion state according to at least one example embodiment.

Referring to FIGS. 6 and 7, as the power transmitting member 135 moves in a downward direction, the sliding frame 14 may also move in the downward direction, thereby moving the motion axis A2 of the subtalar joint in the downward direction. The connecting rod 16 may move faster than the sliding frame 14 in the downward direction, and thus may rotate the rotary frame 15 connected to the sliding frame 14 in the downward direction, that is, in a counterclockwise direction of FIG. 7. The connecting rod 16 may enable the distal support 11 to perform a plantar-flexion motion. The motion assistance apparatus 1 may perform a plantar-flexion motion in a downward direction within a range of 0 to 50 degrees while the user is wearing the motion assistance apparatus 1.

Meanwhile, when the ankle of the user is switched from the dorsi-flexion state to the plantar-flexion state, the skin of the portion adjacent to the ankle of the user may extend. In this example, the structure of the rotary frame 15 to be described later may enable the distal support 11 to simultaneously perform a translational motion and a rotational motion, and thus the distal support 11 may maintain a position relative to the foot of the user. That is, skin chafing that may be caused by extension or compression of the ankle of the user may be prevented.

Figure 8A:
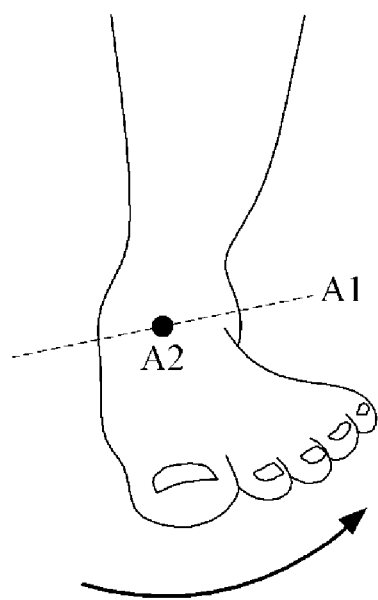
FIG. 8A illustrates an eversion motion of an ankle of a user.
Figure 8B:
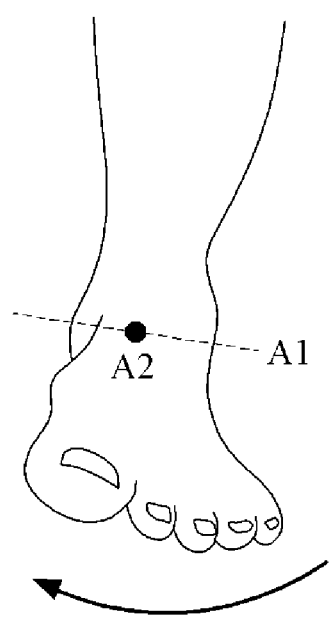
FIG. 8B illustrates an inversion motion of an ankle of a user.

FIG. 8A illustrates an eversion motion of an ankle of a user, and FIG. 8B illustrates an inversion motion of the ankle of the user.

Referring to FIGS. 8A and 8B, the ankle of the user may perform an eversion motion that bends outward from a center of the user, and an inversion motion that bends inward from the center of the user. Based on the motions, a rotation axis A1 of a dorsi-flexion motion and a plantar-flexion motion of a talocrural joint of the user may change as well. In detail, when the ankle performs the eversion motion as shown in FIG. 8A, the rotation axis A1 of the talocrural joint may change to slant downward toward the center of the user. Conversely, when the ankle performs the inversion motion as shown in FIG. 8B, the rotation axis A1 of the talocrural joint may change to slant upward toward the center of the user. In response to the eversion/inversion motion, the slope of the rotation axis A1 of the talocrural joint may change.

Figure 9:
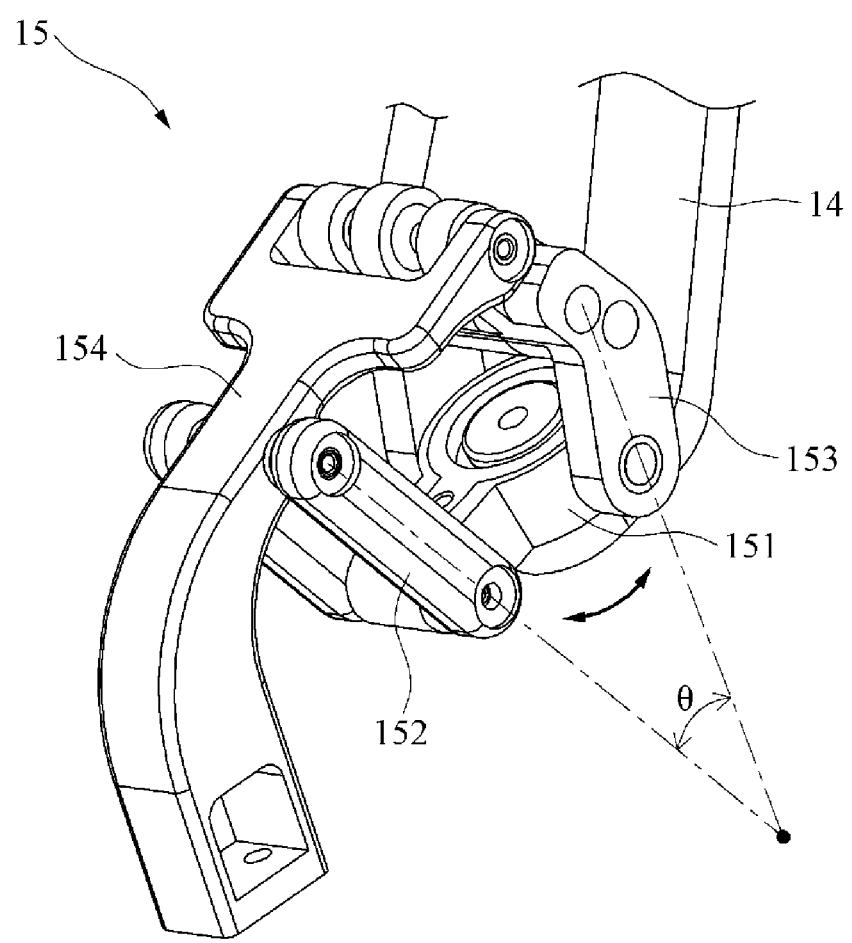
FIG. 9 is an enlarged view illustrating a rotary frame according to at least one example embodiment.
Figure 10:
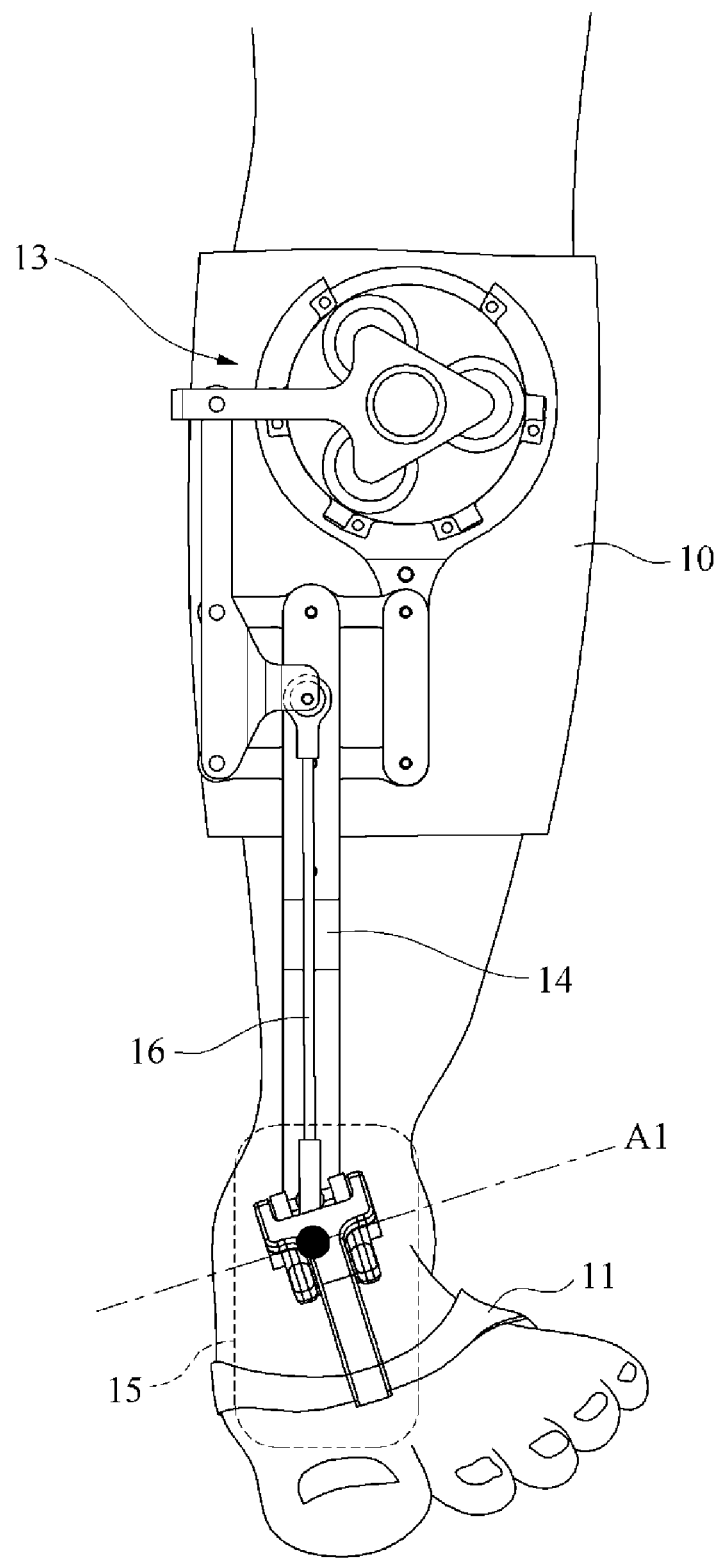
FIG. 10 is a front view of a motion assistance apparatus in an eversion state according to at least one example embodiment.

FIG. 9 is an enlarged view illustrating a rotary frame according to at least one example embodiment, and FIG. 10 is a front view of a motion assistance apparatus in an eversion state according to at least one example embodiment.

Referring to FIGS. 9 and 10, the rotary frame 15 may include a base link 151, a first connecting link 152, a second connecting link 153, and a support link 154.

The base link 151 may be rotatably connected to the sliding frame 14 to follow a motion of a subtalar joint. The base link 151 may be connected to the sliding frame 14 to rotate in a yaw direction as indicated by an arrow in FIG. 9. In detail, the base link 151 may rotate about a rotation axis extending from an ankle of a user toward an upper front side. By the base link 151, when the ankle of the user performs an eversion motion as shown in FIG. 10, the rotary frame 15 may rotate relative to the sliding frame 14 in the yaw direction, whereby the motion assistance apparatus 1 may operate in compliance with the motion of the subtalar joint. For example, the manufactured motion assistance apparatus 1 may perform an eversion motion outward within a range of 0 to 25 degrees while the user is wearing the motion assistance apparatus 1. The same may apply to a case in which the ankle of the user performs an inversion motion, and thus duplicated descriptions will be omitted herein for conciseness. For example, the motion assistance apparatus 1 may perform an inversion motion inward within a range of 0 to 35 degrees while the user is wearing the motion assistance apparatus 1.

The support link 154 may be connected to the distal support 11, and rotate relative to the base link 151 in a pitch direction. The support link 154 may perform a rotational motion on the rotation axis of the base link 151 and a plane to which an extension line extending in a longitudinal direction of a foot belongs. Thus, as shown in FIG. 10, in a state in which the rotary frame 15 rotates in a yaw direction, the support link 154 may operate based on driving of the connecting rod 16, and thus the ankle of the user may move in freedom with two degrees of freedom.

The support link 154 may be connected to the base link 151 through the first connecting link 152 and the second connecting link 153 which are rotatably connected to the base link 151, rather than being connected directly to the base link 151. That is, the rotary frame 15 may include the first connecting link 152 and the second connecting link 153 configured to connect the base link 151 and the support link 154. Due to driving characteristics of a four-bar linkage including the base link 151, the first connecting link 152, the second connecting link 153, and the support link 154, the support link 154 may simultaneously perform a rotational motion and a translational motion relative to the base link 151. By a translational motion component of the support link 154, the distal support 11 connected to the support link 154 may simultaneously perform a rotational motion and a translational motion relative to the proximal support 10 while maintaining a position relative to the foot of the user. In the above structure, although the skin of the foot extends (refer to L2 of FIG. 7) or compresses (refer to L1 of FIG. 5) in response to a dorsi-flexion or plantar-flexion motion of the foot, skin chafing of the foot caused by the distal support 11 may be prevented.

A distance between a pair of straight lines, one connecting the first connecting link 152 and a rotation axis thereof and the other connecting the second connecting link 153 and a rotation axis thereof, may increase from the base link 151 toward the support link 154. That is, a distance between rotation axes of the first connecting link 152 and the second connecting link 153 connected to the support link 154 may be greater than a distance between rotation axes of the first connecting link 152 and the second connecting link 153 connected to the base link 151. Further, an angle θ formed by the straight lines may vary between 20 degrees and 50 degrees in response to a plantar-flexion motion and a dorsi-flexion motion. In the above structure, an instance center of the support link 154 may be positioned near the talocrural joint, and thus the user wearability may improve.

Figure 11:
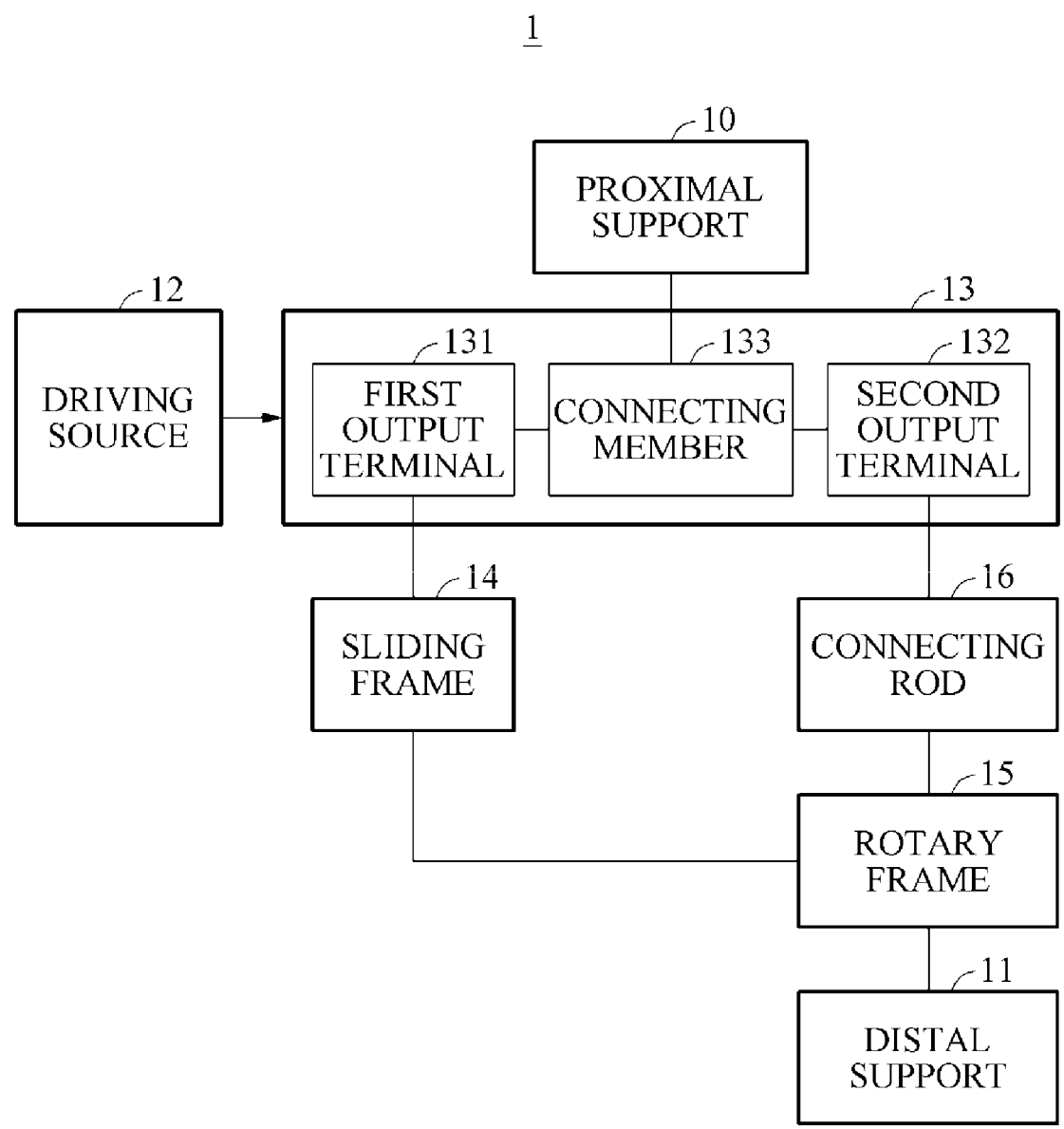
FIG. 11 is a block diagram illustrating a motion assistance apparatus according to at least one example embodiment.

FIG. 11 is a block diagram illustrating a motion assistance apparatus according to at least one example embodiment.

Referring to FIG. 11, the power of the driving source 12 may be transferred through the first output terminal 131, the second output terminal 132, or the connecting member 133. The example embodiments described above illustrate a case in which the power of the driving source 12 is transferred through the second output terminal 132. However, as described in the following example embodiments, the power of the driving source 12 may be transferred through the first output terminal 131 (for example, a first output terminal 231) (see FIGS. 12 and 16), or transferred through the connecting member 133 (see FIGS. 13, 14, and 15).

Figure 12:
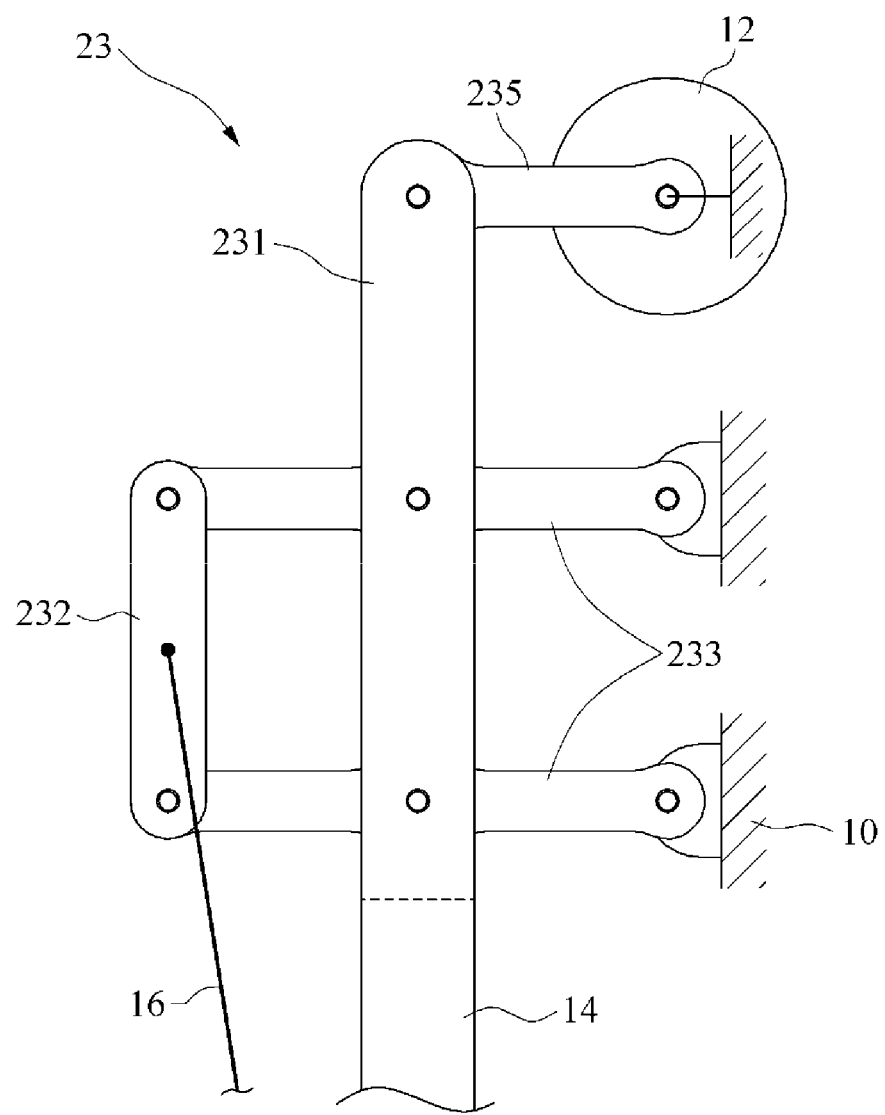
FIG. 12 illustrates a power distributor according to at least one example embodiment.

FIG. 12 illustrates a power distributor according to at least one example embodiment.

Referring to FIG. 12, a power distributor 23 may include a first output terminal 231, a second output terminal 232, connecting members 233, and a power transmitting member 235. Although FIG. 12 illustrates a case in which the power transmitting member 235 is a crank that converts rotational power of the driving source 12 into a linear motion, types of the driving source 12 and the power transmitting member 235 are not limited thereto. The power from the driving source 12 may be transmitted to the first output terminal 231 through the power transmitting member 235. The power transmitted to the first output terminal 231 may be transferred to the second output terminal 232 through the connecting members 233. The first output terminal 231 may move relative to the proximal support 10, and the second output terminal 232 may move relative to the first output terminal 231, thereby causing a speed difference between the sliding frame 14 and the connecting rod 16.

Figure 13:
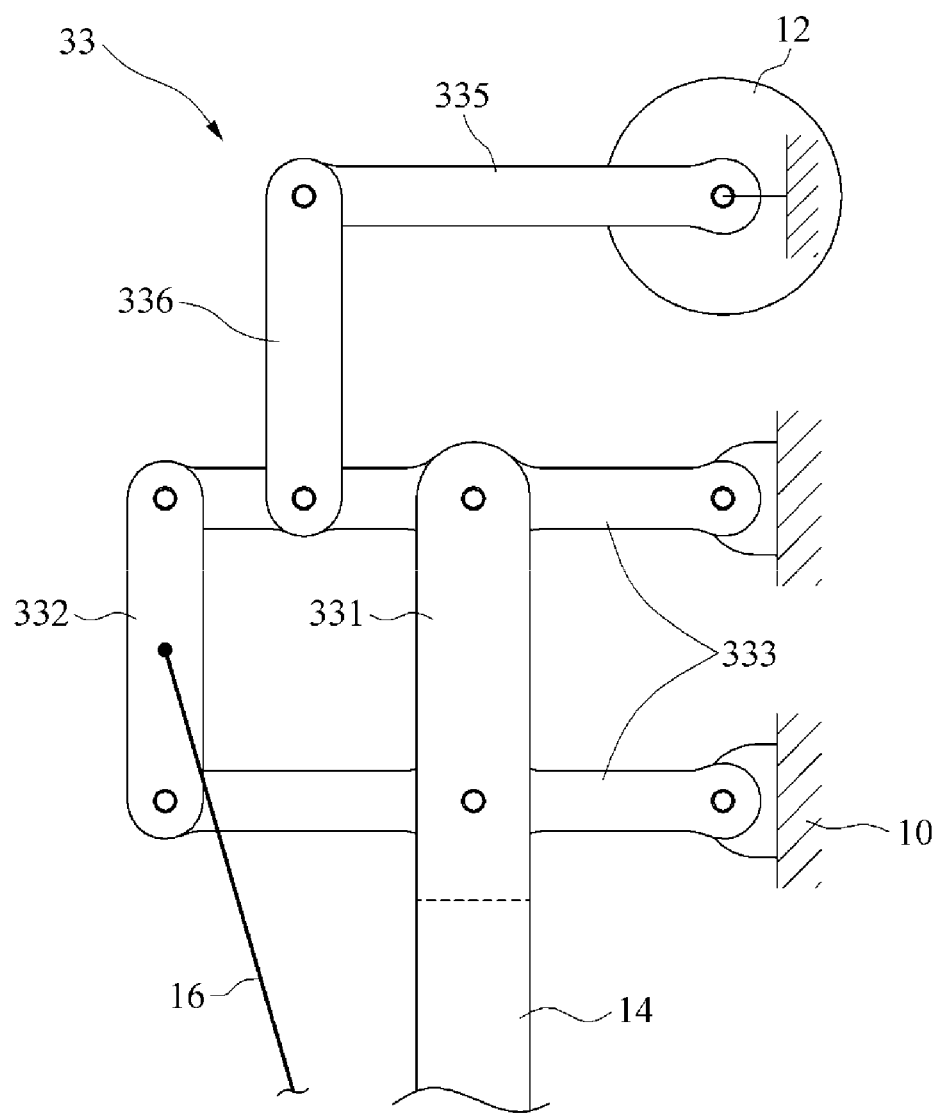
FIG. 13 illustrates a power distributor according to at least one example embodiment.

FIG. 13 illustrates a power distributor according to at least one example embodiment.

Referring to FIG. 13, a power distributor 33 may include a first output terminal 331, a second output terminal 332, connecting members 333, a first power transmitting member 335, and a second power transmitting member 336. The power from the driving source 12 may be transmitted to the connecting members 333 through the first power transmitting member 335 and the second power transmitting member 336. The power transmitted to the connecting members 333 may be transferred to the first output terminal 331 and the second output terminal 332.

Figure 14:
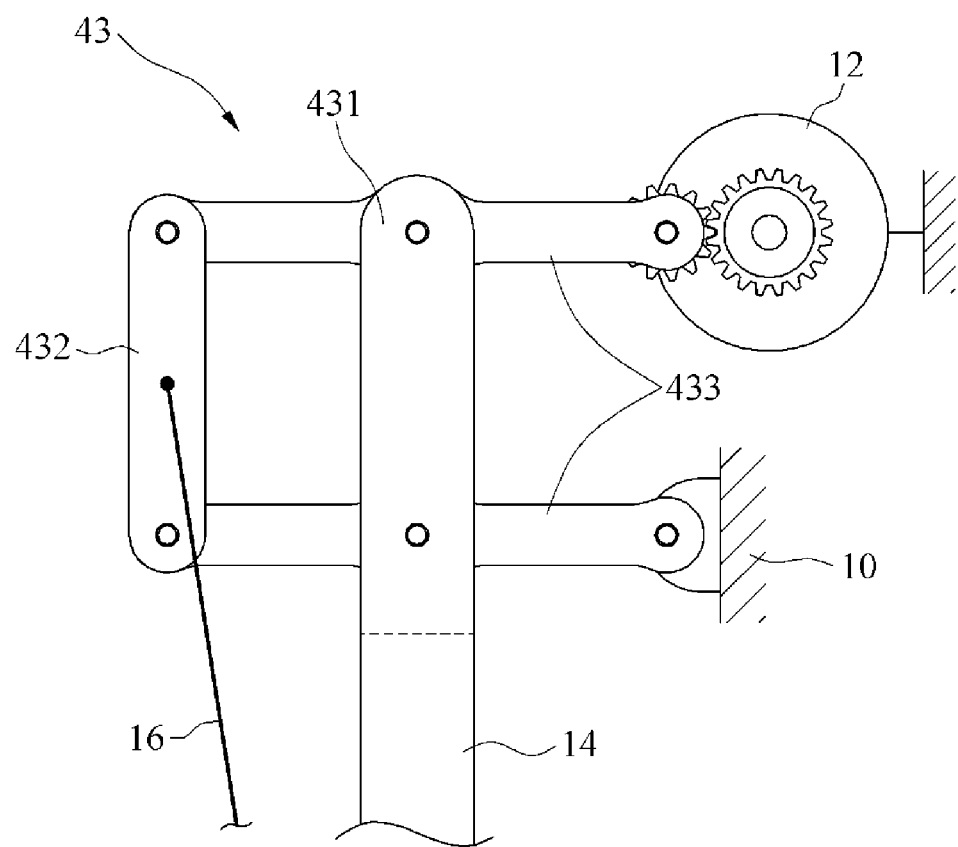
FIG. 14 illustrates a power distributor according to at least one example embodiment.

FIG. 14 illustrates a power distributor according to at least one example embodiment.

Referring to FIG. 14, a power distributor 43 may include a first output terminal 431, a second output terminal 432, and connecting members 433. The power from the driving source 12 may be transmitted to the connecting members 433. The power transmitted to the connecting member 433 may be transferred to the first output terminal 431 and the second output terminal 432.

Figure 15:
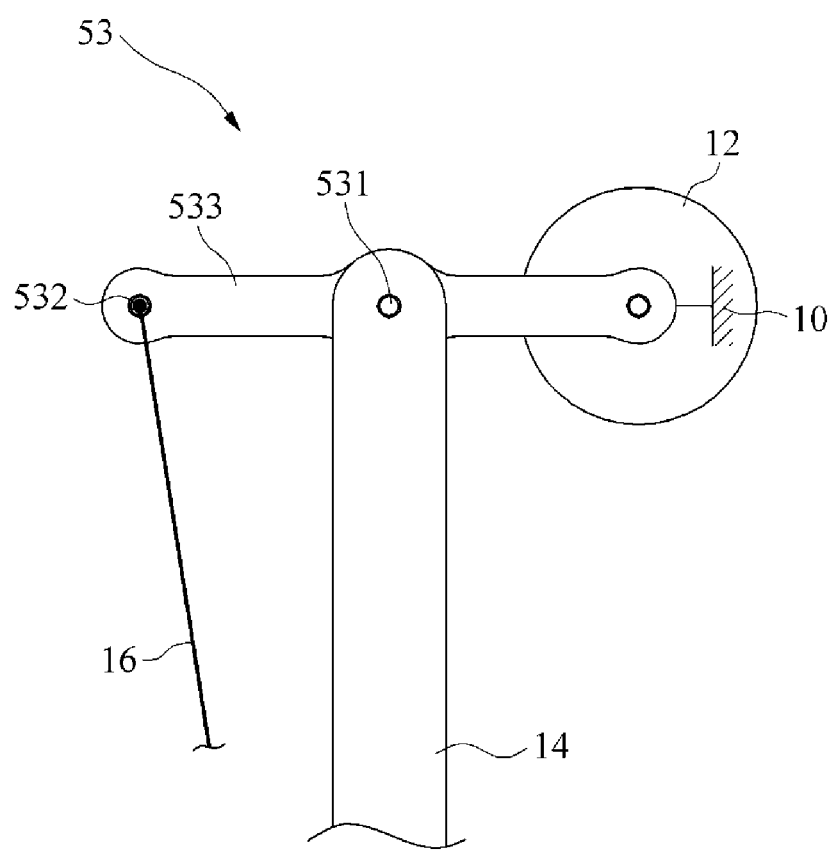
FIG. 15 illustrates a power distributor according to at least one example embodiment.

FIG. 15 illustrates a power distributor according to at least one example embodiment.

Referring to FIG. 15, a power distributor 53 may include a first output terminal 531, a second output terminal 532, and a connecting member 533. As shown in FIG. 15, the first output terminal 531 and the second output terminal 532 may be formed as an integral body with the connecting member 533. For example, the first output terminal 531 and the second output terminal 532 may each refer to a predetermined position defined on the connecting member 533. Similar to the other example embodiments, the power from the driving source 12 may be transmitted to the connecting member 533, and the power transmitted to the connecting member 533 may be transferred to the sliding frame 14 and the connecting rod 16 through the first output terminal 531 and the second output terminal 532, respectively.

Figure 16:
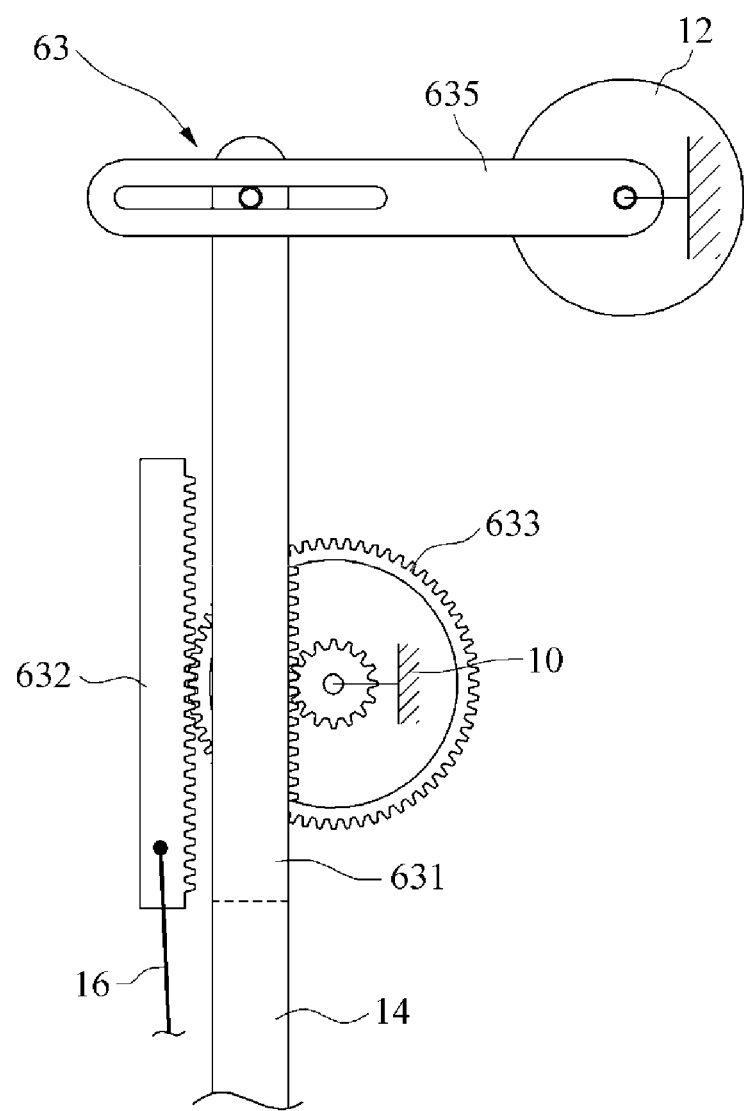
FIG. 16 illustrates a power distributor according to at least one example embodiment.

FIG. 16 illustrates a power distributor according to at least one example embodiment.

Referring to FIG. 16, a power distributor 63 may include a first output terminal 631, a second output terminal 632, a connecting member 633, and a power transmitting member 635. FIG. 16 illustrates a case in which the first output terminal 631, the second output terminal 632, and the connecting member 633 are connected using a rack and pinion mechanism. The connecting member 633 may have a compound gear structure in which two gears with different diameters are connected. When the first output terminal 631 is connected to the small-diameter gear of the connecting member 633, and the second output terminal 632 is connected to the large-diameter gear of the connecting member 633, the second output terminal 632 may move faster than the first output terminal 631. Further, when the first output terminal 631 and the second output terminal 632 engage on the same side from a center of rotation of the connecting member 633, the first output terminal 631 and the second output terminal 632 may move in the same direction.

The power from the driving source 12 may be transmitted to the first output terminal 631 through the power transmitting member 635. The power transmitted to the first output terminal 631 may be transferred to the second output terminal 632 through the connecting member 633. Meanwhile, unlike the above, the power from the driving source 12 may be transmitted to the second output terminal 632 through a power transmitting member, and may be transmitted directly to the connecting member 633. That is, the power from the driving source 12 may be transmitted to one of the first output terminal 631, the second output terminal 632, and the connecting member 633.

Figure 17:
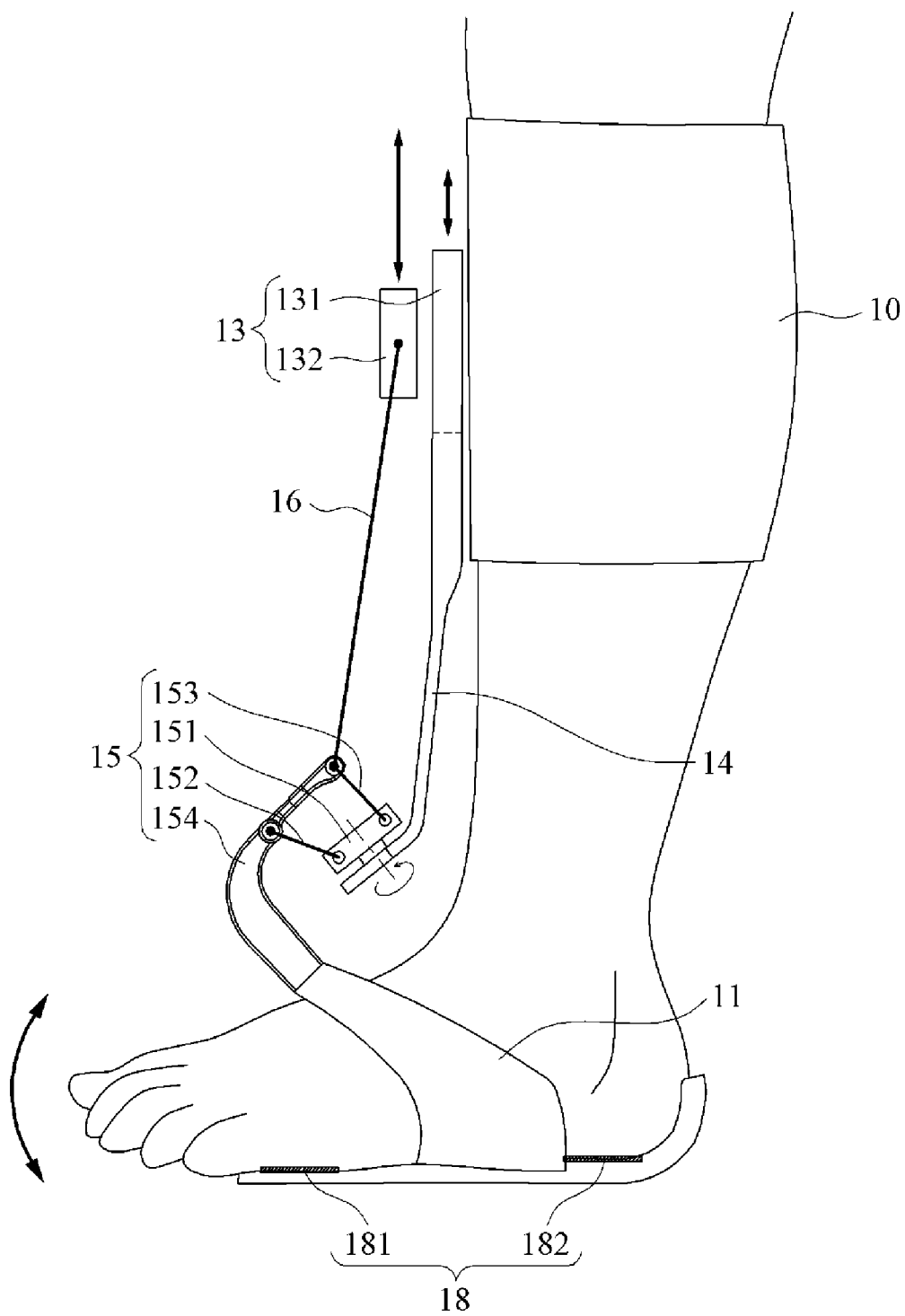
FIG. 17 illustrates a motion assistance apparatus according to at least one example embodiment.
Figure 18:
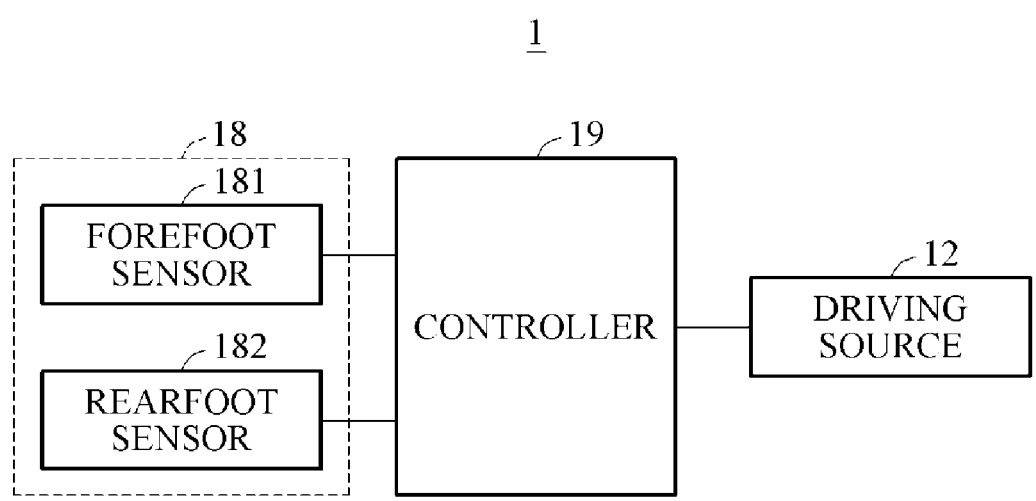
FIG. 18 is a block diagram illustrating a motion assistance apparatus according to at least one example embodiment.

FIG. 17 illustrates a motion assistance apparatus according to at least one example embodiment, and FIG. 18 is a block diagram illustrating the motion assistance apparatus according to at least one example embodiment.

Referring to FIGS. 17 and 18, a motion assistance apparatus 1 may include a driving source 12 configured to provide power to operate a rotary frame 15, a pressure sensor 18 disposed in a distal support 11 to measure a pressure applied by a distal part of a user to the distal support 11, and a controller 19 configured to control the driving source 12 based on data measured by the pressure sensor 18.

The driving source 12 may include a motor that generates torque according to electric energy supplied from a power supply. According to other example embodiments, the driving source 12 may include at least one piston or cylinder device that is operated by the electric energy or by fluidic pressure such as, for example, hydraulic pressure or pneumatic pressure.

The pressure sensor 18 may include various types of sensors to sense pressure, such as pressure sensor, a strain sensor or any other sensor configured to sense a weight of the user.

The controller 19 may include a processor and a memory. The memory may include may include a non-transitory computer readable medium. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The processor may processor may be an arithmetic logic unit, a digital signal processor, a microcomputer, a field programmable array, a programmable logic unit, a microprocessor or any other device capable of responding to and executing instructions in a defined manner. The memory may contain computer readable code that, when executed by the processor, configures the processor as a special purpose computer.

For example, the memory may contain computer readable code that, when executed by the processor, configures the processor as a special purpose computer to determine a gait state based on a pressure measured by the pressure sensor 18, and instruct the driving source 12 to provide power such that the distal support 11 performs dorsi-flexion motion or plantar-flexion motion based on the pressure measured by the pressure sensor 18.

In a case in which a proximal support 10 supports a calf of the user, and the distal support 11 supports a foot of the user, the pressure sensor 18 may include a forefoot sensor 181 configured to sense a pressure at a forefoot of the user, and a rearfoot sensor 182 configured to sense a pressure at a rearfoot of the user.

Figure 19:
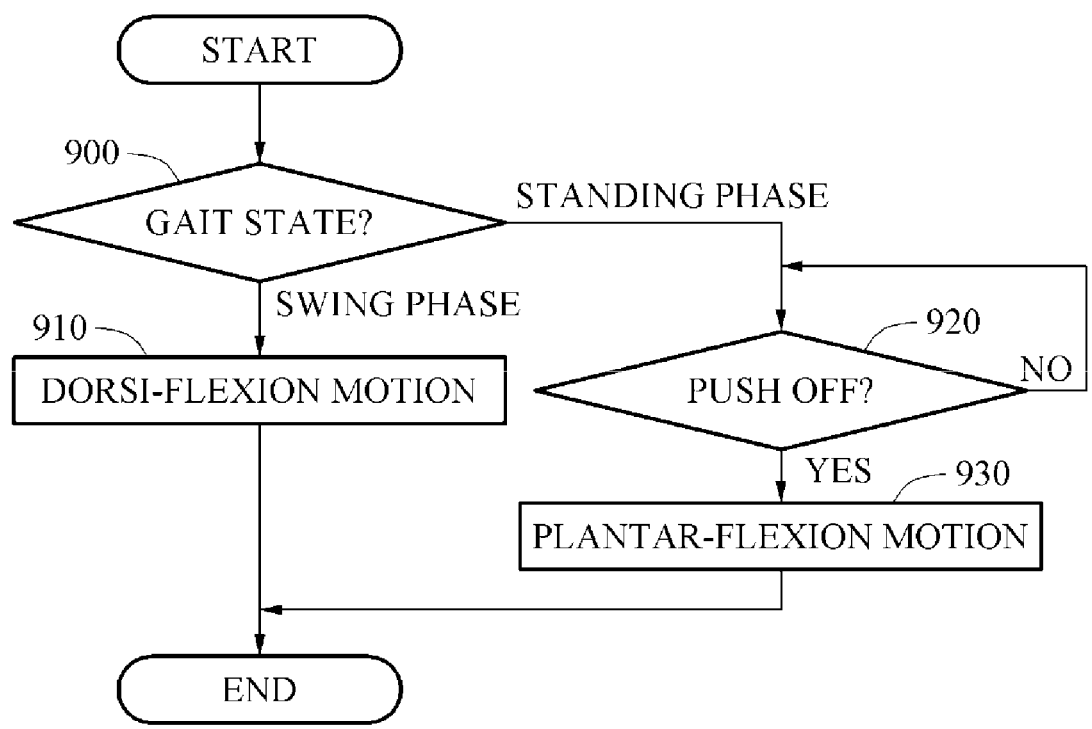
FIG. 19 is a flowchart illustrating a controlling method of a motion assistance apparatus according to at least one example embodiment.

FIG. 19 is a flowchart illustrating a controlling method of a motion assistance apparatus according to at least one example embodiment.

Referring to FIG. 19, in operation 900, the controller 19 may determine a gait state based on a pressure measured by the pressure sensor 18. For example, the controller 19 may determine the gait state of the user to be in a swing phase when the pressure measured by the pressure sensor 18 is less than or equal to a set (or, alternatively, a preset) pressure. Conversely, the controller 19 may determine the gait state of the user to be in a standing phase when the pressure measured by the pressure sensor 18 exceeds the set (or, alternatively, the preset) pressure.

In operation 910, when the controller 19 determines that the gait state of the user is in the swing phase, the controller 19 may control the driving source 12 such that the distal support 11 may perform a dorsi-flexion motion. According to the control method, the foot being dragged on the ground during the swing phase caused by foot drop that an ankle may not be lifted due to knee injury or abnormality in a common peroneal nerve may be reduced (or, alternatively, prevented.)

In operation 920, when the controller 19 determines that the gait state of the user is in the standing phase, the controller 19 may determine whether it is a point in time at which the user is about to perform a push off motion based on a pressure measured by the forefoot sensor 181 and a pressure measured by the rearfoot sensor 182.

For example, the controller 19 may determine the gait state of the user to be in the standing phase when the pressure measured by the forefoot sensor 181 is greater than or equal to a first set pressure. In another example, the controller 19 may determine the gait state of the user to be in the standing phase when a value obtained by subtracting the pressure measured by the rearfoot sensor 182 from the pressure measured by the forefoot sensor 181 is greater than or equal to a second set pressure.

In operation 930, when the controller 19 determines that it is the point in time at which the user is about to perform the push off motion, the controller 19 may control the driving source 12 such that the distal support 11 may perform a plantar-flexion motion. By the controlling method, it is possible to assist the user to perform the push off motion at an appropriate point in time.

Meanwhile, when the controller 19 determines that it is not the point in time at which the user is about to perform the push off motion, the controller 19 may iteratively perform operation 920 and wait until the point in time at which the user is about to perform the push off motion comes.

While not illustrated, in some other example embodiments, the rotary frame 15 may include a holding device, such as an electromagnet, and the controller 19 may be configured to activate the holding device while providing the assistance force to perform the dorsi-flexion motion in operation 910 and/or the plantar-flexion motion in operation 930 such that the user is restricted from performing one or more of eversion and inversion motion. Therefore, the motion assistance apparatus 1 may allow the user to experience both translational motion and rotational motion while securing the user's ankle from injury while assisting the user.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A motion assistance apparatus comprising:
    a power distributor including a first output terminal, a second output terminal and a connecting member configured to connect the first output terminal and the second output terminal;
    a proximal support configured to support a proximal part of a user;
    a distal support configured to support a distal part of the user;
    a rotary frame connected to the distal support and connected to the second output terminal of the power distributor via a connecting rod; and
    a sliding frame connected to the rotary frame and to the first output terminal of the power distributor, the sliding frame configured to perform a translational motion relative to the proximal support to rotate the rotary frame such that the rotary frame is configured to simultaneously perform the translational motion and a rotational motion relative to the proximal support.

2. The motion assistance apparatus of claim 1, wherein the proximal support is configured to support a calf of the user,
    the distal support is configured to support a foot of the user, and
    the rotary frame is on an anterior of an ankle of the user while the user is wearing the motion assistance apparatus.

3. The motion assistance apparatus of claim 1, wherein the proximal support is configured to support a calf of the user,
    the distal support is configured to support a foot of the user, and
    the rotary frame is configured to connect to the distal support via a first portion thereof, the first portion of the rotary frame being between an ankle and a forefoot of the user while the user is wearing the motion assistance apparatus.

4. The motion assistance apparatus of claim 1, wherein the first output terminal and the second output terminal have different translational speeds with respect to the proximal support.

5. The motion assistance apparatus of claim 4, wherein the power distributor further includes a power transmitting member, and
    the power transmitting member is configured to directly transmit the power to one of the first output terminal, the second output terminal, and the connecting member.

6. The motion assistance apparatus of claim 5, wherein the connecting member is rotatably connected to the proximal support.

7. The motion assistance apparatus of claim 1, wherein the second output terminal includes a protrusion configured to protrude toward the first output terminal, and
    a first end portion of the connecting rod is configured to connect to the second output terminal via the protrusion.

8. The motion assistance apparatus of claim 7, wherein the sliding frame performs the translational motion relative to the proximal support, and
    the first end portion of the connecting rod is configured to perform a translational motion relative to the sliding frame, if the power distributor receives the power.

9. The motion assistance apparatus of claim 1, wherein the connecting rod comprises:
    a rod body;
    a first joint at a first end portion of the rod body, the first joint being rotatably connected to the second output terminal with at least two degrees of freedom; and
    a second joint at a second end portion of the rod body, the second joint being rotatably connected to the rotary frame with at least two degrees of freedom.

10. The motion assistance apparatus of claim 1, wherein the connecting member comprises:
    a pair of parallel links each configured to connect the first output terminal and the second output terminal such that the first output terminal and the second output terminal are parallel to each other.

11. The motion assistance apparatus of claim 1, wherein the rotary frame comprises:
    a base link configured to rotate relative to the sliding frame in a yaw direction.

12. The motion assistance apparatus of claim 11, wherein the rotary frame further comprises:
    a support link connected to the distal support, the support link configured to rotate relative to the base link in a pitch direction; and
    a pair of connecting links configured to connect the base link and the support link.

13. The motion assistance apparatus of claim 12, wherein the pair of connecting links are connected to the support link by a first pair of rotational axes and to the base link by a second pair of rotational axes such that a distance between the first pair of rotation axes connected to the support link is greater than a distance between the second pair of rotation axes connected to the base link.

14. The motion assistance apparatus of claim 1, further comprising:
   a driving source configured to provide power to operate the rotary frame;
   at least one pressure sensor associated with the distal support, the at least one pressure sensor configured to measure a pressure applied by the distal part of the user to the distal support; and
   a controller configured to control the driving source based on data measured by the at least one pressure sensor.

15. The motion assistance apparatus of claim 14, wherein the proximal support is configured to support a calf of the user, and the distal support is configured to support a foot of the user, and
   the controller is configured to control the driving source such that the distal support performs a dorsi-flexion motion, if the pressure measured by the at least one pressure sensor is less than or equal to a set pressure.

16. The motion assistance apparatus of claim 14, wherein the proximal support is configured to support a calf of the user, and the distal support is configured to support a foot of the user, and the at least one pressure sensor comprises:
   a forefoot sensor configured to sense a pressure at a forefoot of the user; and
   a rearfoot sensor configured to sense a pressure at a rearfoot of the user.

17. The motion assistance apparatus of claim 16, wherein the controller is configured to control the driving source such that the distal support performs a plantar-flexion motion, if the pressure measured by the forefoot sensor is greater than or equal to a first set pressure.

18. The motion assistance apparatus of claim 16, wherein the controller is configured to control the driving source such that the distal support performs a plantar-flexion motion, if a difference between the pressure measured by the rearfoot sensor and the pressure measured by the forefoot sensor is greater than or equal to a second set pressure.

19. A motion assistance apparatus comprising:
   a power distributor including a first output terminal, a second output terminal and a connecting member, the connecting member configured to connect the first output terminal and the second output terminal;
   a proximal support configured to attach to a portion of a shank below a knee of a user;
   a distal support configured to attached to a foot on a front side of the user on an ankle of the user; and
   a frame structure connected between the proximal support and the distal support such that the frame structure is configured to sit between the knee and the foot on the front side of the user, if the proximal support and the distal support are attached to the user, the frame structure configured to provide an assistance force to assist the user with a movement of the ankle, the frame structure including,
      a rotary frame connected to the distal support and connected to the second output terminal of the power distributor via a connecting rod; and
      a sliding frame connected to the first output terminal of the power distributor, the sliding frame configured to slide relative to the proximal support to rotate the rotary frame such that the rotary frame is configured to simultaneously perform a translational motion and a rotational motion relative to the proximal support.

20. The motion assistance apparatus of claim 19, wherein the motion assistance apparatus is configured to provide the assistance force to the ankle without any movable structures between the shank and the foot on a rear side of the user, if the motion assistance apparatus is attached to the user.

21. The motion assistance apparatus of claim 19, wherein the power distributor is configured to receive power provided by a driving source, and
   the first output terminal and the second output terminal have different translational speeds with respect to the proximal support.

22. The motion assistance apparatus of claim 21, wherein the connecting member comprises:
   a pair of parallel links each configured to connect the first output terminal and the second output terminal such that the first output terminal and the second output terminal are parallel to each other.

23. The motion assistance apparatus of claim 19, wherein the rotary frame has a four-bar linkage structure including a base link connected to the sliding frame, and a support link connected to the distal support.

24. A motion assistance apparatus comprising:
   a power distributor configured to receive power provided by a driving source, the power distributor including a first output terminal, a second output terminal and a connecting member, the connecting member configured to connect the first output terminal and the second output terminal;
   a proximal support configured to attach to a portion below a knee of a user;
   a distal support configured to attach to a foot of the user;
   a rotary frame between the proximal support and the distal support, the rotary frame connected to the second output terminal of the power distributor via a connecting rod, the rotary frame having two degrees of freedom including a first degree of freedom and a second degree of freedom, the first degree of freedom facilitating a dorsi-flexion motion and a plantar-flexion motion relative to a talocrural joint of the user while the motion assistance apparatus is attached to the user, and the second degree of freedom facilitating an eversion motion and an inversion motion relative to a subtalar joint of the user while the motion assistance apparatus is attached to the user; and
   a sliding frame connected to the first output terminal of the power distributor.

25. The motion assistance apparatus of claim 24, wherein the first output terminal and the second output terminal have different translational speeds with respect to the proximal support.

26. The motion assistance apparatus of claim 25, wherein the rotary frame has a four-bar linkage structure including a base link connected to the sliding frame, and a support link connected to the distal support.

27. The motion assistance apparatus of claim 26, wherein the rotary frames comprises:
   a pair of connecting links configured to connect the base link and the support link, wherein
      the support link is configured to simultaneously perform a translational motion and a rotational motion relative to the base link such that the support link has one degree of freedom relative to the base link to allow the dorsi-flexion motion and the plantar-flexion motion relative to the talocrural joint of the user.

28. The motion assistance apparatus of claim 26, wherein the base link is rotatably connected to a rotation axis in the sliding frame such that the base link has one degree of freedom relative to the sliding frame to allow the eversion motion and the inversion motion relative to the subtalar joint of the user.

29. The motion assistance apparatus of claim 25, wherein the connecting member comprises:
  a pair of parallel links each configured to connect the first output terminal and the second output terminal such that the first output terminal and the second output terminal are parallel to each other.

\* \* \* \* \*